(12) United States Patent
Um et al.

(10) Patent No.: US 11,199,751 B2
(45) Date of Patent: Dec. 14, 2021

(54) ARRAY SUBSTRATE AND DISPLAY PANEL (71) Applicant: BOE TECHNOLOGY GROUP CO., LTD., Beijing (CN)

(72) Inventors: Yoon Sung Um, Beijing (CN); Yu'e Jia, Beijing (CN); Feng Liao, Beijing (CN); Hui Zhang, Beijing (CN); Shunhang Zhang, Beijing (CN); Hongrun Wang, Beijing (CN); Liwei Liu, Beijing (CN); Kai Hou, Beijing (CN); Yun Sik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 16/633,905

(22) PCT Filed: Jun. 26, 2019

(86) PCT No.: PCT/CN2019/093075
§ 371 (c)(1),
(2) Date: Jan. 24, 2020

(87) PCT Pub. No.: WO2020/001489
PCT Pub. Date: Jan. 2, 2020

(65) Prior Publication Data
US 2021/0149260 A1    May 20, 2021

(30) Foreign Application Priority Data
Jun. 29, 2018   (CN) .......................... 201810700168.1

(51) Int. Cl.
*G02F 1/1362* (2006.01)
*G02F 1/1343* (2006.01)
(Continued)

(52) U.S. Cl.
CPC .. *G02F 1/136286* (2013.01); *G02F 1/136209* (2013.01); *G02F 1/1368* (2013.01);
(Continued)

(58) Field of Classification Search
None
See application file for complete search history.

(56) References Cited

U.S. PATENT DOCUMENTS

| | | | | |
|---|---|---|---|---|
| 2009/0135125 A1* | 5/2009 | Park | ................. | G02F 1/136286 345/98 |
| 2012/0026136 A1* | 2/2012 | Zhang | ................. | G09G 3/3614 345/204 |

(Continued)

FOREIGN PATENT DOCUMENTS

| | | |
|---|---|---|
| CN | 101950108 A | 1/2011 |
| CN | 102237355 A | 11/2011 |

(Continued)

OTHER PUBLICATIONS

English translation of CN-105789220-A, Title: Dual gate line array substrate, testing method, display panel and display device, Author: Xingfeng Ren; Date of publication: Jul. 20, 2016 (Year: 2016).*

(Continued)

*Primary Examiner* — Shan Liu
(74) *Attorney, Agent, or Firm* — Collard & Roe, P.C.

(57) ABSTRACT

An array substrate and a display panel are provided. The array substrate includes: a plurality of sub-pixels arranged along a row direction and a column direction, four or six adjacent sub-pixel columns constituting a sub-pixel column group; a plurality of data lines extending along the column direction and comprising a first data line and a second data line. In the row direction, the first data line and the second data line are respectively provided on two sides of the sub-pixel column group, and a data line pair including the first data line and the second data line is located between adjacent sub-pixel column groups.

12 Claims, 5 Drawing Sheets

(51) Int. Cl.
*G02F 1/1335* (2006.01)
*G02F 1/1368* (2006.01)

(52) U.S. Cl.
CPC .. *G02F 1/133512* (2013.01); *G02F 1/133514* (2013.01); *G02F 1/134336* (2013.01); *G02F 1/134345* (2021.01); *G02F 1/136218* (2021.01); *G02F 2201/40* (2013.01)

(56) References Cited

U.S. PATENT DOCUMENTS

| | | | |
|---|---|---|---|
| 2012/0033169 A1* | 2/2012 | Lee | G02F 1/134363 349/139 |
| 2016/0011473 A1* | 1/2016 | Kasahara | H01L 27/326 257/72 |
| 2016/0018709 A1* | 1/2016 | Jeong | G02F 1/136213 349/38 |
| 2017/0285428 A1* | 10/2017 | Seong | G09G 3/3648 |
| 2020/0005696 A1* | 1/2020 | Liao | G09G 3/20 |

FOREIGN PATENT DOCUMENTS

| | | | | |
|---|---|---|---|---|
| CN | 105278189 A | | 1/2016 | |
| CN | 105629611 A | | 6/2016 | |
| CN | 105789220 A | * | 7/2016 | ........... H01L 27/283 |
| CN | 207380420 U | | 5/2018 | |

OTHER PUBLICATIONS

International Search Report of PCT/CN2019/093075 in Chinese, dated Oct. 9, 2019, with English translation.

* cited by examiner

ARRAY SUBSTRATE AND DISPLAY PANEL

CROSS REFERENCE TO RELATED APPLICATIONS

This application is the National Stage of PCT/CN2019/093075 filed on Jun. 26, 2019, which claims priority under 35 U.S.C. § 119 of Chinese Application No. 2018-10700168.1 filed on Jun. 29, 2018, the disclosure of which is incorporated by reference.

TECHNICAL FIELD

At least one embodiment of the present disclosure relates to an array substrate and a display panel.

BACKGROUND

A dual gate technology is a driving technology that reduces the number of data lines in a display device by half and doubles the number of gate lines, that is, the number of source electrode driving integrated circuits (IC) connected with the data lines is halved, and the number of gate electrode driving integrated circuits connected with the gate lines is doubled. A unit price of a gate electrode driving integrated circuit is lower than that of a source electrode driving integrated circuit, thereby reducing cost.

SUMMARY

At least one embodiment of the present disclosure provides an array substrate and a display panel.

At least one embodiment of the present disclosure provides an array substrate, which includes: a plurality of sub-pixels arranged along a row direction and a column direction, four or six adjacent sub-pixel columns constituting a sub-pixel column group; a plurality of data lines, extending along the column direction and comprising a first data line and a second data line, where in the row direction, the first data line and the second data line are respectively provided on two sides of the sub-pixel column group, and a data line pair including the first data line and the second data line is located between adjacent sub-pixel column groups.

In some examples, the array substrate further includes a plurality of gate lines, extending along the row direction, the plurality of gate lines includes a first gate line and a second gate line, where the sub-pixel column group includes a plurality of sub-pixel rows, and in the column direction, the first gate line and the second gate line are respectively provided on two sides of each sub-pixel row, and a gate line pair including the first gate line and the second gate line is located between adjacent ones of the plurality of sub-pixel rows.

In some examples, the six adjacent sub-pixel columns constitute the sub-pixel column group, the sub-pixel column group includes a first sub-pixel column, a second sub-pixel column, a third sub-pixel column, a fourth sub-pixel column, a fifth sub-pixel column and a sixth sub-pixel column sequentially arranged along the row direction; the plurality of data lines further include a third data line, the third data line is arranged between the third sub-pixel column and the fourth sub-pixel column; where the first data line is connected with the first sub-pixel column and the second sub-pixel column, the third data line is connected with the third sub-pixel column and the fourth sub-pixel column, and the second data line is connected with the fifth sub-pixel column and the sixth sub-pixel column.

In some examples, the first gate line is connected with one of the first sub-pixel column and the second sub-pixel column, and the second gate line is connected with the other of the first sub-pixel column and the second sub-pixel column; the first gate line is connected with one of the third sub-pixel column and the fourth sub-pixel column, and the second gate line is connected with the other of the third sub-pixel column and the fourth sub-pixel column; the first gate line is connected with one of the fifth sub-pixel column and the sixth sub-pixel column, and the second gate line is connected with the other of the fifth sub-pixel column and the sixth sub-pixel column.

In some examples, in at least one of the plurality of sub-pixel rows in the sub-pixel column group, three sub-pixels located on one side of the third data line have different colors, and three sub-pixels located on the other side of the third data line also have different colors.

In some examples, in one of the plurality of sub-pixel rows of the sub-pixel column group, the three sub-pixels located on one side of the third data line include a red sub-pixel, a green sub-pixel and a blue sub-pixel, and the three sub-pixels located on the other side of the third data line also include a red sub-pixel, a green sub-pixel and a blue sub-pixel.

In some examples, sub-pixels in each of the sub-pixel columns in each of the sub-pixel column groups have a same color.

In some examples, the array substrate further includes a plurality of common electrode lines, where the plurality of common electrode lines are arranged in at least one of between the first sub-pixel column and the second sub-pixel column, between the second sub-pixel column and the third sub-pixel column, between the fourth sub-pixel column and the fifth sub-pixel column, and between the fifth sub-pixel column and the sixth sub-pixel column.

In some examples, the plurality of common electrode lines include a first common electrode line extending along the column direction and passing through the plurality of sub-pixel rows, and the first common electrode line is located in at least one of between the second sub-pixel column and the third sub-pixel column, and between the fourth sub-pixel column and the fifth sub-pixel column.

In some examples, the plurality of common electrode lines further include a second common electrode line, the second common electrode line includes a first line segment extending along the column direction and a second line segment extending along the row direction, one end of the first line segment is electrically connected with the first common electrode line through the second line segment, where the first line segment does not pass a gap between adjacent ones of the plurality of sub-pixel rows, and the first line segment is located in at least one of between the first sub-pixel column and the second sub-pixel column, and between the fifth sub-pixel column and the sixth sub-pixel column.

In some examples, the four adjacent sub-pixel columns constitute the sub-pixel column group, the sub-pixel column group includes a first sub-pixel column, a second sub-pixel column, a third sub-pixel column and a fourth sub-pixel column sequentially arranged along the row direction, and the first data line is connected with the first sub-pixel column and the second sub-pixel column, and the second data line is connected with the third sub-pixel column and the fourth sub-pixel column.

In some examples, the first gate line is connected with one of the first sub-pixel column and the second sub-pixel column, and the second gate line is connected with the other of the first sub-pixel column and the second sub-pixel column; the first gate line is connected with one of the third sub-pixel column and the fourth sub-pixel column, and the second gate line is connected with the other of the third sub-pixel column and the fourth sub-pixel column.

In some examples, four of the plurality of sub-pixels in at least one of the plurality of sub-pixel rows in the sub-pixel column group have different colors.

In some examples, the array substrate further includes: a shielding bar located between the data line and the sub-pixel column closest to the data line and extending along the column direction.

In some examples, the array substrate further includes: a plurality of common electrode lines, where the plurality of common electrodes lines are arranged in at least one of between the first sub-pixel column and the second sub-pixel column, between the second sub-pixel column and the third sub-pixel column and between the third sub-pixel column and the fourth sub-pixel column.

In some examples, the plurality of common electrode lines include a first common electrode line extending along the column direction and passing through the plurality of sub-pixel rows, and the first common electrode line is located between the second sub-pixel column and the third sub-pixel column.

In some examples, the plurality of common electrode lines further include a second common electrode line, the second common electrode line includes a first line segment extending along the column direction and a second line segment extending along the row direction, one end of the first line segment is electrically connected with the first common electrode line through the second line segment, where the first line segment does not pass a gap between adjacent ones of the plurality of sub-pixel rows, and the first line segment is located in at least one of between the first sub-pixel column and the second sub-pixel column, and between the third sub-pixel column and the fourth sub-pixel column.

In some examples, the array substrate further includes: a base substrate and a black matrix, where the plurality of data lines, the plurality of gate lines and the plurality of common electrode lines are located on the base substrate, the black matrix is located on a side of the plurality of data lines, a side of the plurality of gate lines and a side of the plurality of common electrode lines away from the base substrate, and orthogonal projections of the plurality of data lines, the plurality of gate lines and the plurality of common electrode lines on the base substrate are located within an orthogonal projection of the black matrix on the base substrate.

At least one embodiment of the present disclosure provides a display panel including the array substrate as mentioned in any one of the examples.

At least one embodiment of the present disclosure provides a display panel, which includes: the array substrate which does not include the black matrix in at least one example mentioned above; and a color filter substrate, opposite to the array substrate. The color filter substrate includes a black matrix, and an orthogonal projection of the plurality of data lines on the base substrate is located within an orthogonal projection of the black matrix on the base substrate.

In some examples, the array substrate further includes: a plurality of gate lines and a plurality of common electrode lines. The plurality of gate lines extends along the row direction, the plurality of gate lines includes a first gate line and a second gate line, the sub-pixel column group includes a plurality of sub-pixel rows, and in the column direction, the first gate line and the second gate line are respectively provided on two sides of each of the plurality of sub-pixel rows, and a gate line pair including the first gate line and the second gate line is located between adjacent ones of the plurality of sub-pixel rows, orthogonal projections of the plurality of gate lines and the plurality of common electrode lines on the base substrate are located within an orthogonal projection of the black matrix on the base substrate.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects.

Figure 1A:
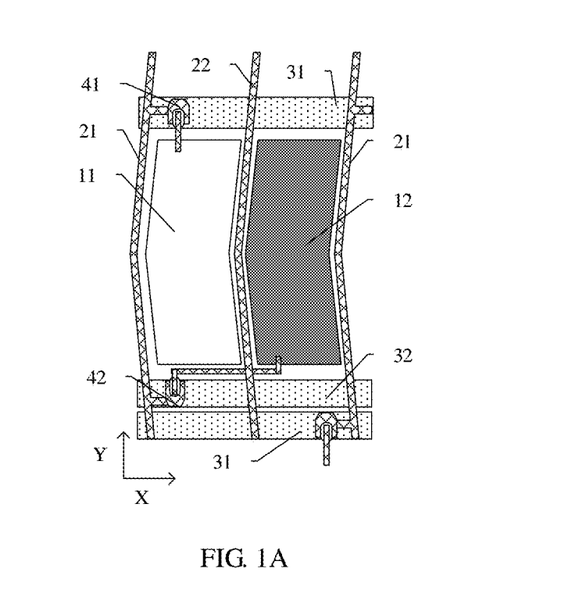
FIG. 1A is a partial structural schematic diagram of a dual gate array substrate.

FIG. 1A is a partial structural schematic diagram of a dual gate array substrate. As shown in FIG. 1A, the dual gate array substrate includes a first sub-pixel 11, a second sub-pixel 12, data lines 21 connected with the first sub-pixel 11 and the second sub-pixel 12 and a common electrode line 22 located between the first sub-pixel 11 and the second sub-pixel 12. A data line 21 is connected with the first sub-pixel 11 through a first thin film transistor 41, and a data line 21 is connected with the second sub-pixel 12 through a second thin film transistor 42. The array substrate further comprises a first gate line 31 and a second gate line 32. Along a Y direction, the first gate line 31 and the second gate line 32 are respectively located on two sides of the first sub-pixel 11 and two sides of the second sub-pixel 12, the first gate line 31 is connected with the first sub-pixel 11 through the first thin film transistor 41, and the second gate line 32 is connected with the second sub-pixel 12 through the second thin film transistor 42. Therefore, in the array substrate shown in FIG. 1A, the first sub-pixel 11 and the second sub-pixel 12 share the same data line 21, but are respectively connected to different gate lines. The array substrate takes the first sub-pixel 11 and the second sub-pixel 12 composing a repeating unit as an example.

For example, the repeating unit constituting of the first sub-pixel 11 and the second sub-pixel 12 may include a red sub-pixel and a green sub-pixel, or a blue sub-pixel and a red sub-pixel, or a green sub-pixel and a blue sub-pixel. Therefore, sub-pixels included in adjacent repeating units may have different colors.

The array substrate can be applied to a liquid crystal display device. In this case, in order to prevent light leakage, a black matrix (not shown) is further arranged on the data lines 21, the common electrode line 22 as well as the first gate line 31 and the second gate line 32. Because the data line 21 and a pixel electrode of the first sub-pixel 11 (the second sub-pixel 12) are prone to generate capacitance, and a liquid crystal molecule located between the pixel electrode and the data line is also easily affected, a shielding bar may be arranged between the data line and the pixel electrode of the sub-pixel.

In a case that a width of a part of the black matrix located on the data line and a width of a part of the black matrix located on the common electrode line along an X direction are designed, considering that light leakage is not liable to occur in a position where the common electrode line is located, the width of the part of the black matrix located on the common electrode line may be narrower, for example, the width of the part of the black matrix located on the common electrode line may be 20 µm. Light leakage is liable to occur in a position where the data line is located, so that the part of the black matrix located on the data line and the part of the black matrix located on the shielding bar may be designed to be wider, for example, the width of the part of the black matrix located on the data line may be 29.5 µm. In this case, in two sub-pixels shown in FIG. 1A, an average width of the black matrix located on the data line 21 and the common electrode line 22 along the X direction is (29.5+20)/2=24.75 µm. In addition, a width of a part of the black matrix located on a gate line along the Y direction is 82 µm. In a case where a size of one sub-pixel is 105 µm*315 µm as an example, an aperture ratio shown in FIG. 1A is about 55.6%.

Figure 1B:
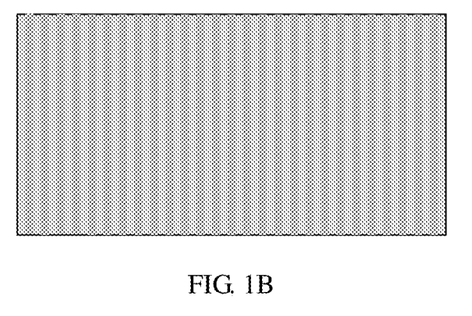
FIG. 1B is a schematic diagram in a case where a display device including the array substrate shown in FIG. 1A is used for display.

FIG. 1B is a schematic diagram in a case where a display device including the array substrate shown in FIG. 1A is used for display. As shown in FIG. 1B, for example, in a case that the display device is a notebook computer, human eyes can observe periodic vertical stripes at 200 mm-500 mm away from a display screen, which indicates that the display device has a dim Mura phenomenon. For example, in a case that the display device is a television, human eyes can observe periodic vertical stripes at 2 m-7 m away from a display screen, which indicates that the display device has a dim Mura phenomenon.

In research, an inventor of the application found that: for a structure shown in FIG. 1A, in a case where a difference between the width of the part of the black matrix on the data line 21 and the part of the width of the black matrix on the common electrode line 22 decreases, the Mura phenomenon can be prevented.

Along the X direction, a specific value of a difference value between the width of the part of the black matrix on the data line and the width of the part of the black matrix on the common electrode line, and a size of a repeating unit is a difference ratio of different parts of the black matrix of the structure shown in FIG. 1A.

For example, as shown in FIG. 1A, along the X direction, a size of the repeating unit is 210 µm. Moreover, along the X direction, in a case that the part of the width of the black matrix on the data line 21 is 29.5 µm, and the width of the part of the black matrix on the common electrode line 22 is 12.5 µm, a difference ratio of the parts of the black matrix is (29.5-12.5)/210=8.1%, and in this case, the structure may have the Mura phenomenon when used for display. Assuming that the width of the part of the black matrix located on the common electrode line 22 is adjusted, for example the width thereof increases to 22 µm, a difference ratio of the parts of the black matrix is (29.5-22)/210=3.6%, and in this case, the structure may not have the Mura phenomenon when used for display. Generally, upon a difference ratio of the parts of the black matrix being less than 4%, the display device may not have the Mura phenomenon.

However, the inventor of the application found that, although the Mura phenomenon can be prevented, an aperture ratio of the display device may also be lowered by increasing the width of the part of the black matrix located on the common electrode line.

At least one embodiment of the present disclosure provides an array substrate and a display panel. The array substrate includes: a plurality of sub-pixels arranged along a row direction and a column direction and a plurality of data lines extending along the column direction. Four or six adjacent sub-pixel columns constitute a sub-pixel column group. The data lines include a first data line and a second data line. Along the row direction, the first data line and the second data line are respectively provided on two sides of the sub-pixel column group, and a data line pair including the first data line and the second data line is located between adjacent sub-pixel column groups. The aperture ratio of the array substrate provided by the present disclosure can be increased.

The array substrate and the display panel provided by the embodiment of the present disclosure will be described in connection with the drawings.

Figure 2:
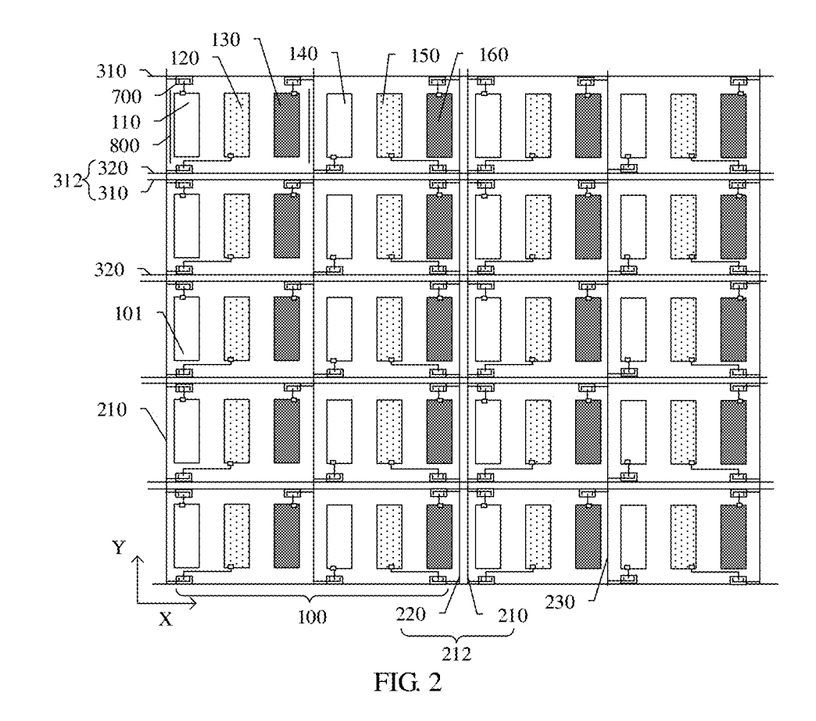
FIG. 2 is a partial structural schematic diagram of an array substrate provided by an embodiment of the present disclosure.

FIG. 2 is a partial structural schematic diagram of an array substrate provided by an embodiment of the present disclosure. As shown in FIG. 2, the array substrate provided by the embodiment includes a plurality of sub-pixels 101 arranged along a row direction (i.e., X direction) and a column direction (i.e., Y direction), and a plurality of data lines extending along the column direction. Six adjacent sub-pixel columns constitute a sub-pixel column group 100, and the plurality of data lines include first data lines 210 and second data lines 220. Along the row direction, a first data line 210 and a second data line 220 are respectively provided on two sides of the sub-pixel column group 100, and a data line pair 212 including the first data line 210 and the second data line 220 is located between adjacent sub-pixel column groups 100. A sub-pixel column in the present disclosure refers to a column of sub-pixels arranged along the Y direction.

For example, as shown in FIG. 2, the six adjacent sub-pixel columns constitute the sub-pixel column group 100, and the sub-pixel column group 100 includes a first sub-pixel column 110, a second sub-pixel column 120, a third sub-pixel column 130, a fourth sub-pixel column 140, a fifth sub-pixel column 150 and a sixth sub-pixel column 160 sequentially arranged along the row direction.

Every six adjacent sub-pixel columns constitute one sub-pixel column group in the present disclosure, and other sub-pixel columns are not located between adjacent sub-pixel column groups. FIG. 2 schematically shows two sub-pixel column groups 100, and in an actual process, the sub-pixel column group 100 can be repeated with an example shown in FIG. 2.

For example, as shown in FIG. 2, the data lines in the embodiment of the present disclosure further include third data lines 230. In each sub-pixel column group 100, a first data line 210 is provided on a side of the first sub-pixel column 110 away from the second sub-pixel column 120, the third data line 230 is provided between the third sub-pixel column 130 and the fourth sub-pixel column 140, the second data line 220 is provided on a side of the sixth sub-pixel column 160 away from the fifth sub-pixel column 150, and the data line pair 212 including the first data line 210 and the second data line 220 is located between adjacent sub-pixel column groups 100.

For example, a sub-pixel column group 100 located on a left side (that is, a direction opposite to a direction that an X arrow points to) in FIG. 2 is a first sub-pixel column group, and a sub-pixel column group 100 located on a right side is a second sub-pixel column group. For example, assuming that the first sub-pixel column group is located on an edge of a left side of the array substrate, the side of the second sub-pixel column group away from the first sub-pixel column group further includes a plurality of sub-pixel column groups, and the second data line 220 located on the right side of the second sub-pixel column group can constitute a data line pair with a first data line located on a left side of a next sub-pixel column group. Similarly, assuming that the second sub-pixel column group is located on an edge of a right side of the array substrate, the side of the first sub-pixel column group away from the second sub-pixel column group further includes a plurality of sub-pixel column groups, and a first data line 210 located on a left side of the first sub-pixel column group can constitute a data line pair with a second data line located on a right side of a next sub-pixel column group.

For example, as shown in FIG. 2, the first sub-pixel column 110 and the second sub-pixel column 120 are both connected to the first data line 210, the third sub-pixel column 130 and the fourth sub-pixel column 140 are both connected to the third data line 230, and the fifth sub-pixel column 150 and the sixth sub-pixel column 160 are both connected to the second data line 220. Therefore, the first sub-pixel column 110 and the second sub-pixel column 120 share the same data line (the first data line 210), the third sub-pixel column 130 and the fourth sub-pixel column 140 share the same data line (the third data line 230), and the fifth sub-pixel column 150 and the sixth sub-pixel column 160 share the same data line (the second data line 220), that is, each data line is connected with two sub-pixel columns.

For example, a display device provided with the array substrate shown in FIG. 2 can be driven by a column inversion method. The column inversion method refers to inverting a polarity of display data every other given number of sub-pixel columns. In the embodiment, voltage polarities stored by two sub-pixel columns connected with the same data line are the same, and are separately opposite to voltage polarities stored by sub-pixel columns connected with two adjacent data lines. Not only can a data delay of a data line be eliminated, but also power consumption can be reduced by the column inversion method.

For example, for the column inversion method, in one time frame, a polarity of a data driving voltage on each data line is always the same polarity (positive or negative).

For example, in one time frame, the first data line 210 located on a left side of the first sub-pixel column group inputs a positive polarity data signal into the first sub-pixel column 110 and the second sub-pixel column 120 in the first sub-pixel column group, the third data line 230 located in the first sub-pixel column group inputs a negative polarity data signal into the third sub-pixel column 130 and the fourth sub-pixel column 140 in the first sub-pixel column group, the first data line 220 located on a right side of the first sub-pixel column group inputs a positive polarity data signal into the fifth sub-pixel column 150 and the sixth sub-pixel column 160 in the first sub-pixel column group, the first data line 210 located on a left side of a second sub-pixel column group inputs a negative polarity data signal into the first sub-pixel column 110 and the second sub-pixel column 120 in the second sub-pixel column group, the third data line 230 located in the second sub-pixel column group inputs a positive polarity data signal into the third sub-pixel column 130 and the fourth sub-pixel column 140 in the second sub-pixel column group, and the second data line 220 located at a right side of the second sub-pixel column group inputs a negative polarity data signal into the fifth sub-pixel column 150 and the sixth sub-pixel column 160 in the second sub-pixel column group. In the next one time frame, positive polarities and negative polarities of the data signals input into the sub-pixel columns by all the data lines are inverted, that is, the polarity of the data driving voltage of each data line is inverted once per frame.

The embodiment is not limited to driving with the column inversion method, and for example, a spot inversion driving method, a row inversion driving method and so on can also be employed.

For example, as shown in FIG. 2, in order to prevent capacitance from being generated between the data lines (for example the first data lines 210 and the second data lines 220) and pixel electrodes of the sub-pixels 101, and influencing an inversion of liquid crystal molecules located between the pixel electrodes and the data lines, a shielding bar 800 extending along the Y direction may be arranged between a data line and a sub-pixel column closest to the data line. For example, FIG. 2 schematically shows two shielding bars 800, and in an actual process, it can be designed such as needed that a shielding bar is arranged between every data line and a sub-pixel column, or shielding bars are arranged between a part of data lines and sub-pixel columns, which will not be limited by the embodiment of the present disclosure.

For example, as shown in FIG. 2, the array substrate provided by the embodiment further includes a plurality of gate lines extending along the row direction. The plurality of gate lines include a plurality of first gate lines 310 and a plurality of second gate lines 320.

For example, as shown in FIG. 2, a sub-pixel column group 100 includes a plurality of sub-pixel rows, and the sub-pixel row here refers to a row of sub-pixels 101 arranged along the X direction.

For example, as shown in FIG. 2, along the column direction, a first gate line 310 and a second gate line 320 are respectively provided on two sides of each sub-pixel row, and a gate line pair 312 including the first gate line 310 and the second gate line 320 is located between adjacent sub-pixel rows, that is, the array substrate provided by the present disclosure is a dual gate array substrate, and a display device employing the dual gate array substrate can reduce cost.

For example, as shown in FIG. 2, the first gate line 310 is connected with one of the first sub-pixel column 110 and the second sub-pixel column 120, and the second gate line 320 is connected with the other of the first sub-pixel column 110 and the second sub-pixel column 120; the first gate line 310 is connected with one of the third sub-pixel column 130 and the fourth sub-pixel column 140, and the second gate line 320 is connected with the other of the third sub-pixel column 130 and the fourth sub-pixel column 140; the first gate line 310 is connected with one of the fifth sub-pixel column 150 and the sixth sub-pixel column 160, and the second gate line 320 is connected with the other of the fifth sub-pixel column 150 and the sixth sub-pixel column 160.

For example, as shown in FIG. 2, in an example of the embodiment, the first gate line 310 is connected with the first sub-pixel column 110, and the second gate line 320 is connected with the second sub-pixel column 120; the first gate line 310 is connected with the third sub-pixel column 130, and the second gate line 320 is connected with the fourth sub-pixel column 140; the first gate line 310 is connected with the sixth sub-pixel column 160, and the second gate line 320 is connected with the fifth sub-pixel column 150; and the embodiment is not limited thereto.

For example, as shown in FIG. 2, each sub-pixel 101 includes a thin film transistor 700. A gate electrode of the thin film transistor 700 is connected with a gate line, a drain electrode of the thin film transistor 700 is connected with a pixel electrode of the sub-pixel, and a source electrode of the thin film transistor 700 is connected with a data line.

For example, as shown in FIG. 2, thin film transistors 700 located in two adjacent sub-pixels 101 respectively in the first sub-pixel column 110 and the second sub-pixel column 120 are distributed on two sides of the sub-pixels 101 along the Y direction so as to connect the sub-pixels 101 of the first sub-pixel column 110 to the first gate lines 310, and connect the sub-pixels 101 of the second sub-pixel column 120 to the second gate lines 320. Similarly, thin film transistors 700 located in two adjacent sub-pixels 101 respectively in the third sub-pixel column 130 and the fourth sub-pixel column 140 are distributed on two sides of the sub-pixels 101 along the Y direction so as to connect the sub-pixels 101 of the third sub-pixel column 130 to the first gate lines 310, and connect the sub-pixels 101 of the fourth sub-pixel column 140 to the second gate line 320; thin film transistors 700 located in two adjacent sub-pixels 101 respectively in the fifth sub-pixel column 150 and the sixth sub-pixel column 160 are distributed on two sides of the sub-pixels 101 along the Y direction so as to connect the sub-pixels 101 of the sixth sub-pixel column 160 to the first gate lines 310, and connect the sub-pixels 101 of the fifth sub-pixel column 150 to the second gate lines 320.

For example, as shown in FIG. 2, in a sub-pixel row in the sub-pixel column group 100, three sub-pixels 101 located on one side of the third data line 230 have different colors, and three sub-pixels 101 located on the other side of the third data line 230 also have different colors.

For example, as shown in FIG. 2, a sub-pixel row in the sub-pixel column group 100 includes two red sub-pixels, two green sub-pixels and two blue sub-pixels. For example, the three sub-pixels 101 located on one side of the third data line 230 include a red sub-pixel, a green sub-pixel and a blue sub-pixel so as to constitute one pixel. Three sub-pixels 101 located on the other side of the third data line 230 also include a red sub-pixel, a green sub-pixel and a blue sub-pixel so as to constitute another pixel. A sub-pixel row in the sub-pixel column group 100 in the embodiment includes two pixels, and a data line is arranged only therebetween, while in the structure shown in FIG. 1A, a data line is located between adjacent sub-pixels of the same pixel. By comparing a distribution relationship of the pixels and the data lines in this embodiment with a distribution relationship of the pixels and the data lines in the structure shown in FIG. 1A, in this embodiment, the data lines have less influence on the pixel electrodes of the pixels, and a Mura phenomenon is less likely to occur.

For example, as shown in FIG. 2, in one example of the embodiment, in any sub-pixel row, sub-pixels 101 in the first sub-pixel column 110 are red sub-pixels, sub-pixels 101 in the second sub-pixel column 120 are green sub-pixels, sub-pixels 101 in the third sub-pixel column 130 are blue sub-pixels, sub-pixels 101 in the fourth sub-pixel column 140 are red sub-pixels, sub-pixels 101 in the fifth sub-pixel column 150 are green sub-pixels, and sub-pixels 101 in the sixth sub-pixel column 160 are blue sub-pixels, and the embodiment includes but is not limited thereto.

For example, as shown in FIG. 2, sub-pixels 101 in each sub-pixel column in the sub-pixel column group 100 have the same color.

For example, as shown in FIG. 2, the first sub-pixel column 110 is a red sub-pixel column, the second sub-pixel column 120 is a green sub-pixel column, the third sub-pixel column 130 is a blue sub-pixel column, the fourth sub-pixel column 140 is a red sub-pixel column, the fifth sub-pixel column 150 is a green sub-pixel column, and the sixth sub-pixel column 160 is a blue sub-pixel column. The embodiment includes but is not limited thereto, colors of all the sub-pixel columns can be interchanged, as long as the above-described six sub-pixel columns include two red sub-pixel columns, two green sub-pixel columns and two blue sub-pixel columns, and the sub-pixel columns having different colors are alternately arranged.

In the embodiment, no data lines are arranged on two sides of the second sub-pixel column and two sides of the fifth sub-pixel column along the X direction, so as to reduce the influence of the data lines on pixel electrodes of the sub-pixel columns, that is, prevent the capacitance from being generated between the data lines and the pixel electrodes of the sub-pixel columns.

Figure 3:
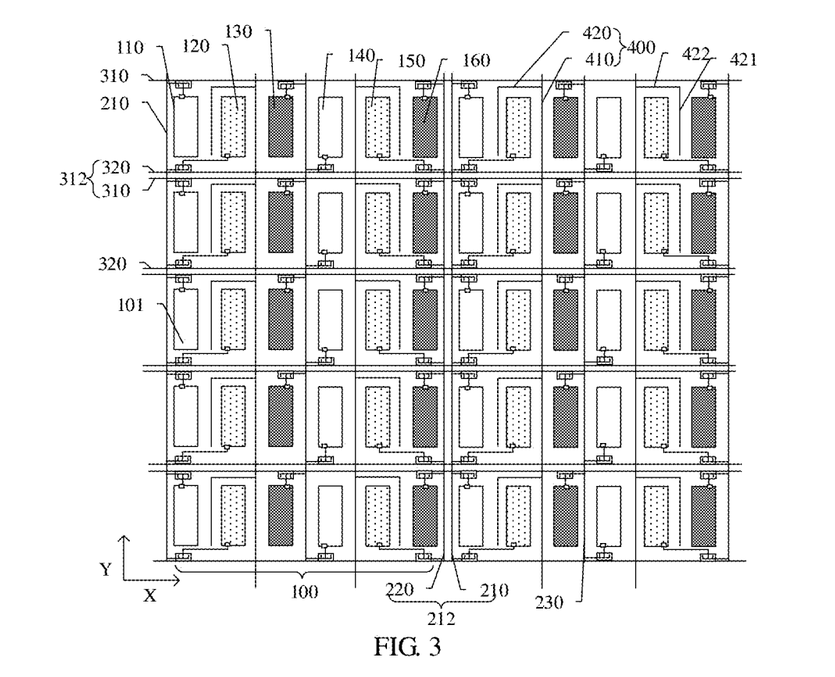
FIG. 3 is a partial structural schematic diagram of an array substrate provided by another embodiment of the present disclosure.

For example, FIG. 3 is a partial structural schematic diagram of an array substrate provided by another embodiment of the present disclosure. As shown in FIG. 3, the array substrate provided by the embodiment further includes: a plurality of common electrode lines 400.

For example, as shown in FIG. 3, the common electrode lines 400 are arranged in at least one of between a first sub-pixel column 110 and a second sub-pixel column 120, between the second sub-pixel column 120 and a third sub-pixel column 130, between a fourth sub-pixel column 140 and a fifth sub-pixel column 150, and between the fifth sub-pixel column 150 and a sixth sub-pixel column 160, that is, the common electrode line 400 and a data line are not both arranged between two adjacent sub-pixel columns.

For example, as shown in FIG. 3, the embodiment takes a case where the common electrode lines 400 are arranged between the first sub-pixel column 110 and the second sub-pixel column 120, between the second sub-pixel column 120 and the third sub-pixel column 130, between the fourth sub-pixel column 140 and the fifth sub-pixel column 150, and between the fifth sub-pixel column 150 and the sixth sub-pixel column 160 as an example, but is not limited thereto. In a case where the array substrate provided by embodiment is applied to a liquid crystal display device, the common electrode line arranged between adjacent sub-pixel columns can avoid light leakage and color mixing.

For example, as shown in FIG. 3, the common electrode lines 400 include first common electrode lines 410 extending along a column direction and passing through a plurality of sub-pixel columns, and the first common electrode line 410 is located in at least one of between the second sub-pixel column 120 and the third sub-pixel column 130, and between the fourth sub-pixel column 140 and the fifth sub-pixel column 150.

For example, as shown in FIG. 3, the embodiment takes the first common electrode lines 410 being arranged between the second sub-pixel column 120 and the third sub-pixel column 130, and between the fourth sub-pixel column 140 and the fifth sub-pixel column 150 as an example, but is not limited thereto.

For example, as shown in FIG. 3, the common electrode lines 400 further include second common electrode lines 420. The second common electrode line 420 includes a first line segment 421 extending along a column direction and a second line segment 422 extending along a row direction, and one end of the first line segment 421 is electrically connected with the first common electrode line 410 through the second line segment 422. The first common electrode line 410 and the second common electrode line 420 are electrically connected in the embodiment, which can reduce resistance of the common electrode line.

For example, as shown in FIG. 3, the first line segment 421 of the second common electrode line 420 does not pass through a gap between adjacent sub-pixel rows, and the first line segment 421 is located in at least one of between the first sub-pixel column 110 and the second sub-pixel column 120, and the fifth sub-pixel column 150 and the sixth sub-pixel column 160.

For example, as shown in FIG. 3, the embodiment takes the second common electrodes lines 420 being arranged between the first sub-pixel column 110 and the second sub-pixel column 120, and the fifth sub-pixel column 150 and the sixth sub-pixel column 160 as an example, but is not limited thereto.

For example, as shown in FIG. 3, the first line segments 421 located in adjacent sub-pixel rows along a Y direction are discontinuous.

Figure 4:
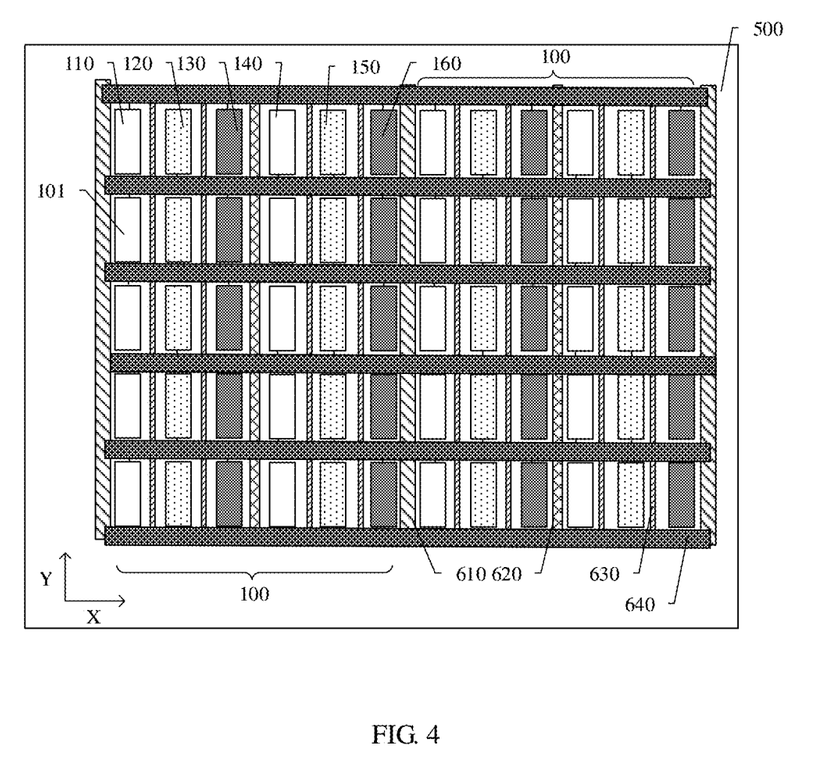
FIG. 4 is a partial structural schematic diagram of an array substrate including a black matrix provided by an embodiment of the present disclosure.

For example, FIG. 4 is a partial structural schematic diagram of an array substrate including a black matrix provided by an embodiment of the present disclosure. As shown in FIG. 4, the array substrate further includes a base substrate 500; and data lines, common electrode lines (common electrode lines shown in FIG. 3) and gate lines (gate lines shown in FIG. 3) are located on the base substrate 500. The array substrate further includes a black matrix, the black matrix is located on a side of the data lines, the common electrode lines and the gate lines away from the base substrate 500, and orthogonal projections of the data lines, the gate lines and the common electrode lines on the base substrate 500 are located within an orthogonal projection of the black matrix on the base substrate 500.

For example, as shown in FIG. 4, in a case that a width of a part of the black matrix located on a data line and a width of a part of the black matrix located on a common electrode line along an X direction are designed, considering that light leakage is not liable to occur in a position where the common electrode line is located, the part of the black matrix arranged on the common electrode line can be narrower. As light leakage is liable to occur in a position where the data line is located, the part of the black matrix located on the data line (and a shielding bar) are designed to be wider.

For example, the part of the black matrix located on a data line pair is a first black matrix, the part of the black matrix located on a third data line is a second black matrix, and the part of the black matrix located on the common electrode line is a third black matrix. A width of the first black matrix 610 may be 4-6 times a width of the third black matrix 630; the width of the first black matrix 610 may be 1.3-1.8 times a width of the second black matrix 620.

For example, in the embodiment, the width of the third black matrix 630 may be 8.5 µm. For example, in the embodiment, the width of the first black matrix 610 may be 42.5 µm, and the width of the second black matrix 620 may be 29.5 µm. In a case where the common electrode lines are arranged between a first sub-pixel column 110 and a second sub-pixel column 120, between the second sub-pixel column 120 and a third sub-pixel column 130, between a fourth sub-pixel column 140 and a fifth sub-pixel column 150, and between the fifth sub-pixel column 150 and a sixth sub-pixel column 160 as an example, an average width of the parts of the black matrix located on the data line and the common electrode line along an X direction is (42.5+8.5+8.5+29.5+8.5+8.5)/6=17.67 µm. In addition, a width of a fourth black matrix 640 located on the gate line along a Y direction is 82 µm. By taking a size of one sub-pixel being 105 µm*315 µm as an example, an aperture ratio shown in FIG. 4 is about 60.6%. Compared with the array substrate shown in FIG. 1A, the aperture ratio of the array substrate provided by the embodiment increases by about 9%. Therefore, in the embodiment, the aperture ratio can be increased by reducing the width of the part of the black matrix located on the common electrode line.

Generally, in a case where a difference ratio of the first black matrix 610 to the second black matrix 620 is less than 4%, a display device applying the array substrate basically has no risk of generating a Mura phenomenon.

A difference ratio of the first black matrix to the second black matrix in the present disclosure refers to: along a row direction, a specific value of a difference value between a size of the first black matrix and a size of the second black matrix to a size of each sub-pixel column group.

For example, in the embodiment, the width of the first black matrix 610 along the X direction is 42.5 µm, the width of the second black matrix 620 along the X direction is 29.5 µm, and a width of one sub-pixel column group 100 along the X direction is 630 µm. Therefore, a difference ratio of the first black matrix 610 to the second black matrix 620 in the embodiment is (42.5−29.5)/630=2.1%, and the difference ratio is less than a general difference ratio (4%) that a Mura phenomenon is not generated, and thus, when the array substrate provided by the embodiment is applied to a liquid crystal display device, the display device basically has no risk of generating the Mura phenomenon.

Figure 5:
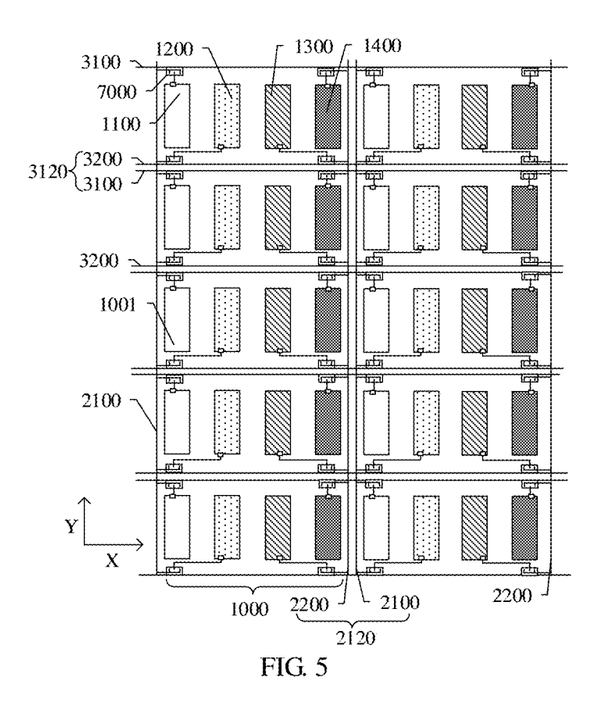
FIG. 5 is a partial structural schematic diagram of an array substrate provided by another embodiment of the present disclosure.

For example, FIG. 5 is a partial structural schematic diagram of an array substrate provided by another embodiment of the present disclosure. As shown in FIG. 5, in the embodiment, four adjacent sub-pixel columns constitute a sub-pixel column group 1000, and the sub-pixel column group 1000 includes a first sub-pixel column 1100, a second sub-pixel column 1200, a third sub-pixel column 1300 and a fourth sub-pixel column 1400 sequentially arranged along a row direction. Every four adjacent sub-pixel columns constitute one sub-pixel column group 1000 in the present disclosure, and other sub-pixel column groups are not located between the adjacent sub-pixel column groups 1000. FIG. 5 schematically shows two sub-pixel column groups 1000, and in an actual process, the sub-pixel column group 1000 can be repeated with an example as shown in FIG. 5.

For example, as shown in FIG. 5, data lines of the present disclosure include first data lines 2100 and second data lines 2200. In each sub-pixel column group 1000, a first data line 2100 is provided on a side of the first sub-pixel column 1100 away from the second sub-pixel column 1200, a second data line 2200 is provided on a side of the fourth sub-pixel column 1400 away from the third sub-pixel column 1300, and a data line pair 2120 including the first data line 2100 and the second data line 220 is located between adjacent sub-pixel column groups 1000.

For example, as shown in FIG. 5, the first sub-pixel column 1100 and the second sub-pixel column 1200 are both connected to the first data line 2100, and the third sub-pixel column 1300 and the fourth sub-pixel column 1400 are connected to the second data line 2200. Therefore, the first sub-pixel column 1100 and the second sub-pixel column 1200 share the same data line (the first data line 2100), and the third sub-pixel column 1300 and the fourth sub-pixel column 1400 share the same data line (the second data line 2200), i.e., each data line is connected with two sub-pixel columns.

For example, the array substrate provided by the embodiment can employ a driving mode same as the driving mode in the embodiment shown in FIG. 2, and the embodiment is not limited thereto.

For example, as shown in FIG. 5, the array substrate further includes a plurality of gate lines extending along the row direction. The plurality of gate lines include a plurality of first gate lines 3100 and a plurality of second gate lines 3200.

For example, as shown in FIG. 5, the sub-pixel column group 1000 includes a plurality of sub-pixel rows.

For example, as shown in FIG. 5, along a column direction, a first gate line 3100 and a second gate line 3200 are respectively provided on two sides of each sub-pixel row, and a gate line pair 3120 including the first gate line 3100 and the second gate line 3200 is located between adjacent sub-pixel rows, that is, the array substrate provided by the present disclosure is a dual gate array substrate, and a display device employing the dual gate array substrate can reduce cost.

For example, as shown in FIG. 5, the first gate line 3100 is connected with one of the first sub-pixel column 1100 and the second sub-pixel column 1200, and the second gate line 3200 is connected with the other of the first sub-pixel column 1100 and the second sub-pixel column 1200; the first gate line 3100 is connected with one of the third sub-pixel column 1300 and the fourth sub-pixel column 1400, and the second gate line 3200 is connected with the other of the third sub-pixel column 1300 and the fourth sub-pixel column 1400.

For example, as shown in FIG. 5, in an example of the embodiment, a first gate line 3100 is connected with a first sub-pixel column 1100, and a second gate line 3200 is connected with a second sub-pixel column 1200; the first gate line 3100 is connected with a fourth sub-pixel column 1400, and the second gate line 3200 is connected with a third sub-pixel column 1300. The embodiment includes but is not limited thereto.

For example, as shown in FIG. 5, each sub-pixel 1001 includes a thin film transistor 7000. A gate electrode of the thin film transistor 7000 is connected with a gate line, a drain electrode of the thin film transistor 7000 is connected with a pixel electrode of a sub-pixel, and a source electrode of the thin film transistor 7000 is connected with a data line.

For example, as shown in FIG. 5, four sub-pixels 1001 in one sub-pixel row in the sub-pixel column group 1000 have different colors.

For example, as shown in FIG. 5, one sub-pixel row in the sub-pixel column group 1000 includes a red sub-pixel, a green sub-pixel, a blue sub-pixel and a white sub-pixel so as to constitute one pixel.

For example, as shown in FIG. 5, in an example of the embodiment, in any sub-pixel row, sub-pixels 1001 in the first sub-pixel column 1100 are red sub-pixels, sub-pixels 1001 in the second sub-pixel column 1200 are green sub-pixels, sub-pixels 1001 in the third sub-pixel column 1300 are blue sub-pixels, and sub-pixels 1001 in the fourth sub-pixel column 1400 are white sub-pixels.

For example, as shown in FIG. 5, the sub-pixels 1001 in each sub-pixel column in the sub-pixel column group 1000 have the same color.

For example, the first sub-pixel column 1100 is a red sub-pixel column, the second sub-pixel column 1200 is a green sub-pixel column, the third sub-pixel column 1300 is a blue sub-pixel column, and the fourth sub-pixel column 1400 is a white sub-pixel column. The embodiment includes but is not limited thereto, and all of the sub-pixel columns can be interchanged in color.

No data lines are arranged on two sides of the second sub-pixel column and two sides of the third sub-pixel column along an X direction in the embodiment, so as to reduce the influence of the data lines on the pixel electrodes of the sub-pixel columns, that is, prevent capacitance from being generated between the data lines and the pixel electrodes of the sub-pixel columns.

Figure 6:
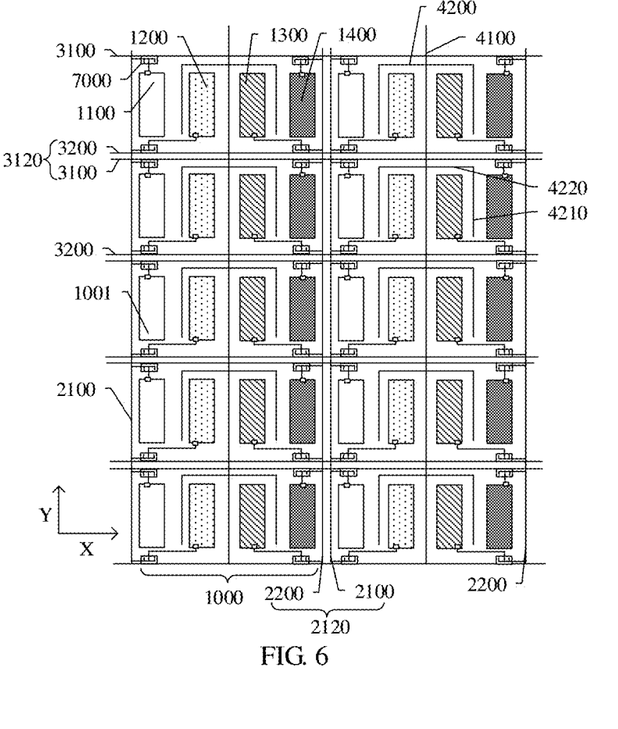
FIG. 6 is a partial structural schematic diagram of an array substrate provided by another embodiment of the present disclosure.

For example, FIG. 6 is a partial structural schematic diagram of an array substrate provided by another embodiment of the present disclosure. As shown in FIG. 6, the array substrate further includes: a plurality of common electrode lines.

For example, as shown in FIG. 6, the common electrode lines are arranged in at least one of between the first sub-pixel column 1100 and the second sub-pixel column 1200, between the second sub-pixel column 1200 and the third sub-pixel column 1300 and between the third sub-pixel column 1300 and the fourth sub-pixel column 1400, that is, the common electrode line and the data line are not both arranged between two adjacent sub-pixel columns.

For example, as shown in FIG. 6, the embodiment takes the common electrode lines being arranged between the first sub-pixel column 1100 and the second sub-pixel column 1200, between the second sub-pixel column 1200 and the third sub-pixel column 1300 and between the third sub-pixel column 1300 and the fourth sub-pixel column 1400 as an example, but is not limited thereto. When the array substrate provided by the embodiment is applied to a liquid crystal display device, the common electrode line arranged between adjacent sub-pixel columns can avoid light leakage and color mixing.

For example, as shown in FIG. 6, the common electrode lines include a first common electrode lines 4100 extending along a column direction and passing through a plurality of sub-pixel rows, and the first common electrode line 4100 is located between the second sub-pixel column 1200 and the third second sub-pixel column 1300.

For example, as shown in FIG. 6, the common electrode lines further include second common electrode lines 4200, the second common electrode line 4200 includes a first line segment 4210 extending along the column direction and a second line segment 4220 extending along a row direction, and one end of the first line segment 4210 is electrically connected with the first common electrode line 4100 through the second line segment 4220. The first common electrode line is electrically connected with the second common electrode line in the embodiment, which can reduce resistance of the common electrode line.

For example, as shown in FIG. 6, the first line segment 4210 of the second common electrode line 4200 does not pass a gap between adjacent sub-pixel rows, and the first line segment 4210 is located in at least one of between the first sub-pixel column 1100 and the second sub-pixel column 1200, and between the third sub-pixel column 1300 and the fourth sub-pixel column 1400.

For example, as shown in FIG. 6, an example of the embodiment takes second common electrode lines 4200 being arranged between the first sub-pixel column 1100 and the second sub-pixel column 1200, and between the third sub-pixel column 1300 and the fourth sub-pixel column 1400 as an example in, but it is not limited thereto.

For example, as shown in FIG. 6, first line segments 4210 located in adjacent sub-pixel rows are discontinuous along a Y direction.

For example, the array substrate may further include a black matrix (not shown) located on the data lines, the common electrode lines and the gate lines.

For example, in the embodiment, a width of a part of the black matrix located on the common electrode line can be designed to be 8.5 µm, and a width of a part of the black matrix located on a data line pair can be 42.5 µm. In a case where the common electrode lines are arranged between the first sub-pixel column and the second sub-pixel column, between the second sub-pixel column and the third sub-pixel column, and between the third sub-pixel column and the fourth sub-pixel column as an example, an average width of the black matrix located on the data lines and the common electrode lines along an X direction is $(42.5+8.5+8.5+8.5)/4=17$ µm. In addition, a width of a part of the black matrix located on a gate line along the Y direction is 82 µm. By taking a size of one sub-pixel being 105 µm*315 µm as an example, an aperture ratio shown in FIG. 6 is about 62%. Compared with the array substrate shown in FIG. 1A, the aperture ratio of the array substrate provided by the embodiment of the present disclosure increases by about 11.5%. Therefore, in the embodiment, the aperture ratio can be increased by reducing the width of the black matrix located on the common electrode line.

In addition, theoretically, when the array substrate shown in FIG. 6 is applied to a liquid crystal display device, the display device basically has no risk of generating a Mura phenomenon.

Figure 7:
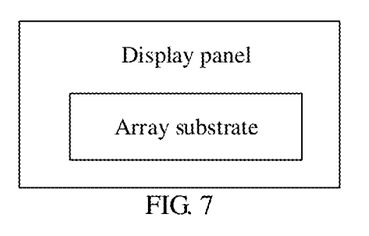
FIG. 7 is a schematic block diagram of a display panel provided by an embodiment of the present disclosure.

For example, FIG. 7 is a schematic block diagram of a display panel provided by one embodiment of the present disclosure. As shown in FIG. 7, the display panel includes an array substrate provided by any one of above-described embodiments, the display panel employing the above-described array substrate can have the aperture ratio increased, and a risk of generating Mura is relatively low.

For example, the array substrate comprised by the display panel shown in FIG. 7 can be an array substrate including a black matrix.

For example, a display device employing the display panel shown in FIG. 7 may be a liquid crystal display device and any product or component with a display function, such as a television, a digital camera, a mobile phone, a watch, a flat computer, a notebook computer and a navigator including the display device, and the embodiment is not limited thereto.

Figure 8:
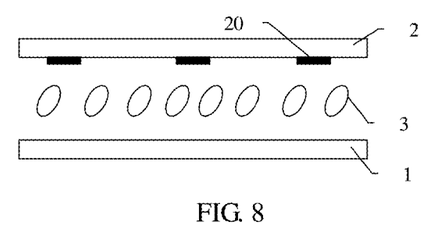
FIG. 8 is a partial structural schematic diagram of a display panel provided by another embodiment of the present disclosure.

For example, FIG. 8 is a partial structural schematic diagram of a display panel provided by another embodiment of the present disclosure. As shown in FIG. 8, the display panel includes an array substrate 1 not including a black matrix in any one of the above-described embodiments. The display panel further includes a color filter substrate 2 opposite to the array substrate 1 and a liquid crystal layer 3 located between the color filter substrate 2 and the array substrate 1.

For example, as shown in FIG. 8, the color filter substrate 2 includes a black matrix 20, the black matrix 20 is located on data lines, common electrode lines and gate lines (the data lines, the common electrode lines and the gate lines shown in FIG. 3 or FIG. 6) on the array substrate 1, that is, orthogonal projections of the data lines, the common electrode lines and the gate lines on the color filter substrate 2 completely fall into the black matrix 20, and a black matrix provided by the embodiment has a size of the black matrix provided by the above-described embodiment, which will not be repeated here. The aperture ratio of the display panel provided by the embodiment can be increased, and a risk of generating Mura is relatively low.

For example, a display device employing the display panel shown in FIG. 8 may be a liquid crystal display device and any product or component with a display function, such as a television, a digital camera, a mobile phone, a watch, a flat computer, a notebook computer and a navigator including the display device, and the embodiment is not limited thereto.

The following points need to be explained:

(1) In the drawings of the embodiments of the present disclosure, only the structures related to the embodiments of the present disclosure are involved, and other structures may refer to the common design.

(2) Without conflict, features in the same embodiment and different embodiments of the present disclosure can be combined with each other.

The foregoing is only specific embodiments of the present disclosure, but the protection scope of the present disclosure is not limited thereto. The scope of protection of the present disclosure shall be defined by the claims.

What is claimed is:

1. An array substrate, comprising:
    a plurality of sub-pixels arranged along a row direction and a column direction, six adjacent sub-pixel columns constituting a sub-pixel column group;
    a plurality of data lines, extending along the column direction and comprising a first data line and a second data line,
    a plurality of gate lines, extending along the row direction, the gate lines comprising a first gate line and a second gate line,
    wherein, in the row direction, the first data line and the second data line are respectively provided on two sides of the sub-pixel column group, and a data line pair including the first data line and the second data line is located between adjacent sub-pixel column groups;
    the sub-pixel column group comprises a plurality of sub-pixel rows, and in the column direction, the first gate line and the second gate line are respectively provided on two sides of each sub-pixel row, and a gate line pair including the first gate line and the second gate line is located between adjacent ones of the plurality of sub-pixel rows;

the six adjacent sub-pixel columns constitute the sub-pixel column group, the sub-pixel column group comprises a first sub-pixel column, a second sub-pixel column, a third sub-pixel column, a fourth sub-pixel column, a fifth sub-pixel column and a sixth sub-pixel column sequentially arranged along the row direction;

the plurality of data lines further comprise a third data line, the third data line is arranged between the third sub-pixel column and the fourth sub-pixel column;

the first data line is connected with the first sub-pixel column and the second sub-pixel column, the third data line is connected with the third sub-pixel column and the fourth sub-pixel column, and the second data line is connected with the fifth sub-pixel column and the sixth sub-pixel column.

2. The array substrate according to claim 1, wherein the first gate line is connected with one of the first sub-pixel column and the second sub-pixel column, and the second gate line is connected with the other of the first sub-pixel column and the second sub-pixel column; the first gate line is connected with one of the third sub-pixel column and the fourth sub-pixel column, and the second gate line is connected with the other of the third sub-pixel column and the fourth sub-pixel column; the first gate line is connected with one of the fifth sub-pixel column and the sixth sub-pixel column, and the second gate line is connected with the other of the fifth sub-pixel column and the sixth sub-pixel column.

3. The array substrate according to claim 1, wherein, in at least one of the plurality of sub-pixel rows in the sub-pixel column group, three sub-pixels located on one side of the third data line have different colors, and three sub-pixels located on the other side of the third data line also have different colors.

4. The array substrate according to claim 3, wherein, in one of the plurality of sub-pixel rows of the sub-pixel column group, the three sub-pixels located on one side of the third data line comprise a red sub-pixel, a green sub-pixel and a blue sub-pixel, and the three sub-pixels located on the other side of the third data line also comprise a red sub-pixel, a green sub-pixel and a blue sub-pixel.

5. The array substrate according to claim 1, further comprising:
a plurality of common electrode lines, wherein the plurality of common electrode lines are arranged in at least one of between the first sub-pixel column and the second sub-pixel column, between the second sub-pixel column and the third sub-pixel column, between the fourth sub-pixel column and the fifth sub-pixel column, and between the fifth sub-pixel column and the sixth sub-pixel column.

6. The array substrate according to claim 5, wherein the plurality of common electrode lines comprise a first common electrode line extending along the column direction and passing through the plurality of sub-pixel rows, and the first common electrode line is located in at least one of between the second sub-pixel column and the third sub-pixel column, and between the fourth sub-pixel column and the fifth sub-pixel column.

7. The array substrate according to claim 6, wherein the plurality of common electrode lines further comprise a second common electrode line, the second common electrode line comprises a first line segment extending along the column direction and a second line segment extending along the row direction, one end of the first line segment is electrically connected with the first common electrode line through the second line segment, wherein the first line segment does not pass a gap between adjacent ones of the plurality of sub-pixel rows, and the first line segment is located in at least one of between the first sub-pixel column and the second sub-pixel column, and between the fifth sub-pixel column and the sixth sub-pixel column.

8. The array substrate according to claim 5, further comprising:
a base substrate and a black matrix, wherein the plurality of data lines, the plurality of gate lines and the plurality of common electrode lines are located on the base substrate, the black matrix is located on a side of the plurality of data lines, a side of the plurality of gate lines and a side of the plurality of common electrode lines away from the base substrate, and orthogonal projections of the plurality of data lines, the plurality of gate lines and the plurality of common electrode lines on the base substrate are located within an orthogonal projection of the black matrix on the base substrate.

9. The array substrate according to claim 1, further comprising:
a shielding bar located between a data line and the sub-pixel column closest to the data line and extending along the column direction.

10. A display panel, comprising the array substrate of claim 1.

11. A display panel, comprising:
the array substrate of claim 1; and
a color filter substrate, opposite to the array substrate, wherein the color filter substrate comprises a black matrix, and an orthogonal projection of the plurality of data lines on a base substrate of the array substrate is located within an orthogonal projection of the black matrix on the base substrate.

12. The display panel according to claim 11, wherein the array substrate further comprises: a plurality of common electrode lines,
orthogonal projections of the plurality of gate lines and the plurality of common electrode lines on the base substrate are located within an orthogonal projection of the black matrix on the base substrate.

* * * * *